June 9, 1959 K. GOLDSCHMIDT 2,890,287

IMPULSE DIAL

Filed Dec. 30, 1954 3 Sheets-Sheet 1

INVENTOR
K. GOLDSCHMIDT
BY
ATTORNEY

LOOP CURRENT WAVE FORM WHEN LINE IDENTIFICATION WHEEL IN SUBSCRIBER SET IS RELEASED. SUBSCRIBER'S NUMERALS ARE "7501"

KEYWAY FOR LUGS

IDENTIFICATION LUG

INVENTOR
K. GOLDSCHMIDT
BY
ATTORNEY

June 9, 1959 K. GOLDSCHMIDT 2,890,287

IMPULSE DIAL

Filed Dec. 30, 1954 3 Sheets-Sheet 3

INVENTOR
K. GOLDSCHMIDT
BY [signature]
ATTORNEY

United States Patent Office 2,890,287

Patented June 9, 1959

2,890,287

IMPULSE DIAL

Karl Goldschmidt, New Providence, N.J., assignor to Bell Telephone Laboratories, Incorporated, New York, N.Y., a corporation of New York Application December 30, 1954, Serial No. 478,697

16 Claims. (Cl. 179—90)

This invention relates to telephone systems and more particularly to apparatus for identifying calling stations in such systems.

In accordance with present day practice, in a number of systems a telephone toll call initiated at a subscriber's station is completed under the control of a so-called "long distance" operator. By dialing "zero" or other long distance designation the subscriber reaches this operator and gives the details of the desired connection, including the calling number to be charged.

To obviate the necessity for the intervention of exchange operators, it has been proposed to provide facilities whereby a calling subscriber may establish the desired toll connections solely through the use of the dial located at the subscriber station. This has presented the problem of identifying the calling subscriber for billing purposes, and the present devices utilized to accomplish this end have several disadvantages. First, there is no means provided for identifying calling subscribers in large private branch exchanges, and consequently intervention of an operator is required. Furthermore, the use of automatic subscriber identification for party line systems is limited in the number of party line subscribers that can be identified. Also, there is no entirely satisfactory method of checking the accuracy of the identification impulses in case there should be an error in transmission.

One object of this invention, therefore, is to provide a new and improved means for identifying a calling subscriber.

Another object of the invention is to facilitate the checking of identification impulses at the central office.

Another object of the invention is to provide automatic identification of calling subscribers in a manner such that party line identification will not be necessary.

A further object of the invention is to facilitate the identification of calling subscribers in private branch exchanges.

Still another object of the invention is to provide a calling subscriber identification device utilizing, in general, known and comparatively simple mechanical and electrical elements, which is economical to manufacture and thoroughly reliable in operation.

In accordance with one feature of the invention, an additional digit on the dial is utilized to actuate an identification impulse wheel which, in turn, operates a pair of contacts so that impulses may be sent out to the central office.

In accordance with another feature of the invention, impulses are sent out from the calling device in a self-checking code, so that the accuracy of these impulses may be easily checked at the central office.

A further feature of the invention resides in utilizing the calling device itself as a means for line identification, thereby avoiding the problems incident to party line identification and facilitating identification of individual subscriber stations in private branch exchanges.

The invention and the features thereof will be understood more clearly and fully from the following detailed description with reference to the accompanying drawings, in which.

Figure 1:
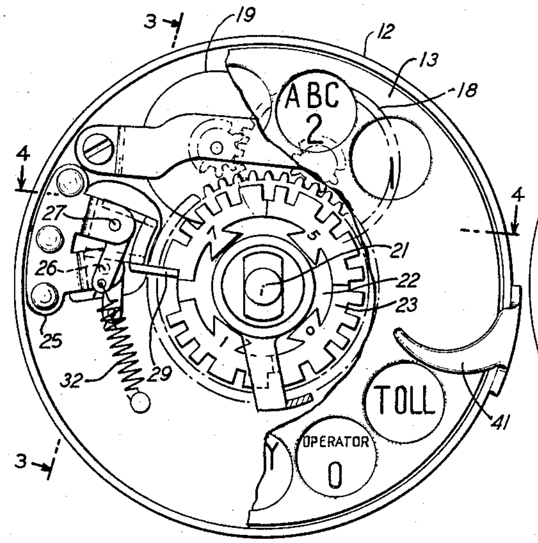
Fig. 1 is a front view of a device illustrative of one embodiment of the invention with part of the dial removed, showing the location of the identification impulse wheel with its corresponding lugs inserted.
Figures 10, 11:
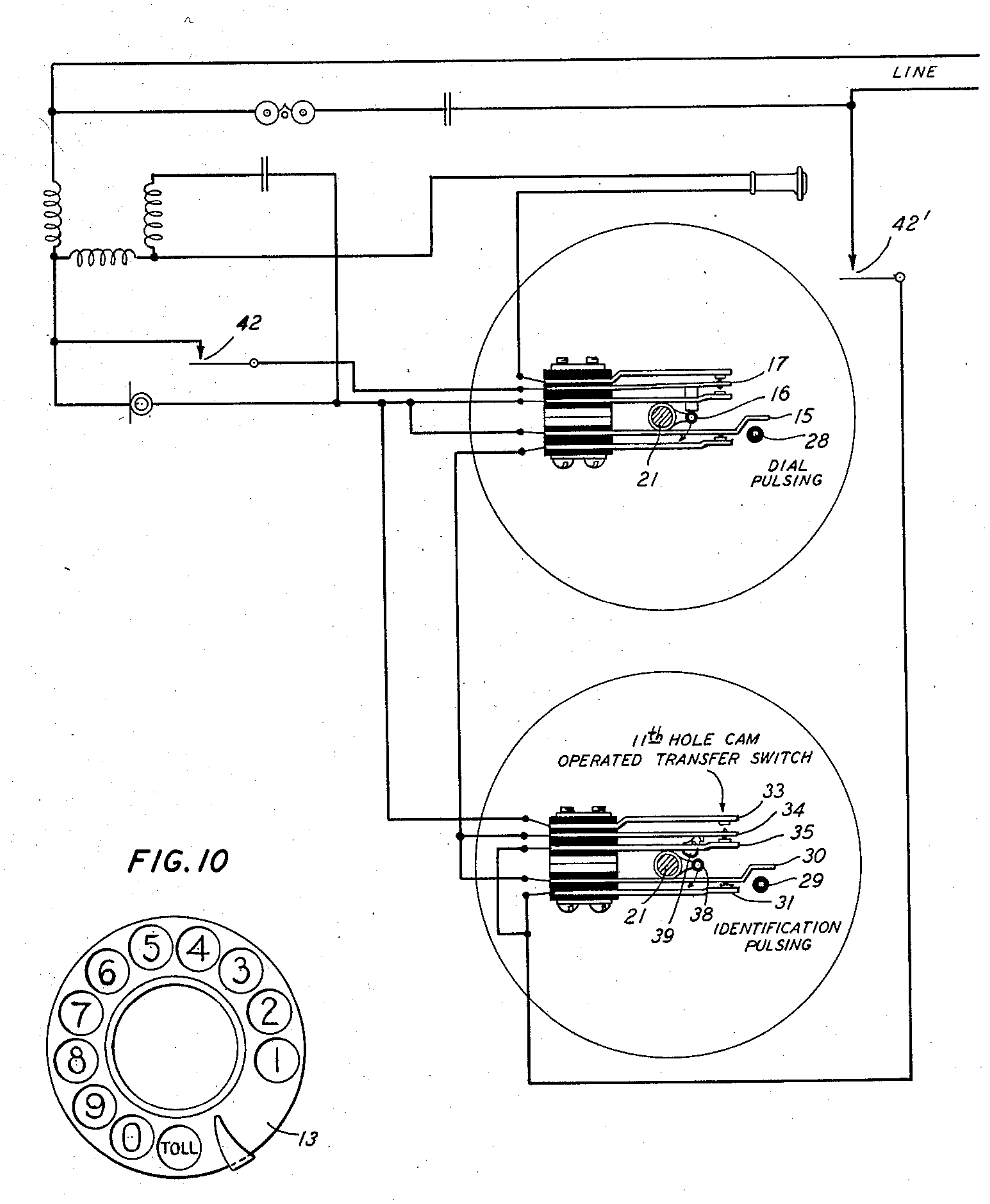
Fig. 10 is a front view of the dial showing the location of the eleventh, or "Toll," hole.
Fig. 11 is a schematic diagram of the substation circuit of a subscriber set, including identification mechanism constructed in accordance with the invention.

In Fig. 1 there is shown a calling device of the finger dial type, of the general construction shown in United States Patent 1,161,854 to Oscar F. Forsberg, granted November 30, 1915, embodying the present invention. The various mechanisms of the device are supported by the usual cup-shaped member 12, including the eleven hole dial 13. This dial is similar to the ones in common use except that it has eleven finger holes and is adaptable for rotation to eleven impulse positions instead of the customary ten. The first ten of these holes serve their normal function of enabling the subscriber to dial the desired number, while the eleventh, or "Toll," hole is used to transmit the calling number by sending out a series of impulses in code. In the normal position of the finger wheel, this additional hole follows the usual "zero" hole is spaced therefrom in a counterclockwise direction and is located immediately above a section of the number plate which bears the designation "Toll," "11," or some other appropriate designation. The positioning of the dial finger holes is illustrated in Fig. 10.

The telephone dial mechanism of this invention, except for the addition of the eleventh hole identification pulsing system, is of well-known construction and of the type in common usage. It includes the normal impulse wheel 14 which actuates the dial impulse spring 15 when the dial is released from any one of the first ten impulse positions, thereby sending out a series of impulses corresponding to the number dialed by the subscriber. The insulated roller 16 closes the shunt springs 17 as the dial starts its forward motion and opens these springs just before the dial returns to normal, thus removing the transmitter and receiver from the line during the dialing operation. The gear wheel 18 operates the governor 19 as the dial is released, so that the speed at which the normal dial pulses are sent out is controlled.

Strips of insulating material 20 are used to sufficiently separate the impulse spring 15 from the shunt springs 17 so that the shaft 21 may be extended to actuate the transfer switch springs 33, 34 and 35. The operation of this transfer switch will be subsequently described.

Figure 5:
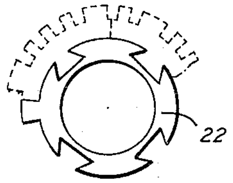
Figs. 5, 6 and 7 show the assembly of the identification impulse wheel.
Figure 6:
Figure 7:
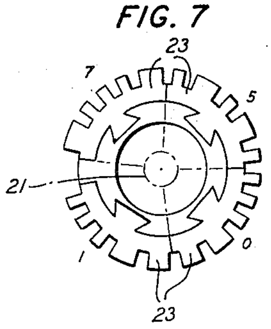

The assembly of the identification impulse wheel 22 and 23 is shown in detail in Figs. 5, 6 and 7. The keyway 22 is constructed to accommodate several interchangeable lugs 23. Although four are shown in the drawings, the number of lugs to be employed will depend on the number of digits in the calling subscriber's number or upon the nature of other desired information to be sent. The lugs are interchangeable so that an installer may insert the proper lugs corresponding to the subscriber's numerals into the keyed slots. Each lug is arranged with five projections along its periphery, two of the projections being wider than the other three, thus registering a two-out-of-five count. As the wheel rotates, the projections open a pair of contacts and give line identification to the central office register on a two-out-of-five pulse duration basis. For example, if the desired digit is "seven," the lug is cut as shown in Fig. 6. The initial long pulse followed by three short pulses and finally another long pulse contain the information (0, 1, 2, 4, 7). Therefore, 0+7=7 is the digit being sent. By using a self-checking code of this type, a single error will produce a combination not valid in the code so that it may easily be detected at the central office register.

Figure 8:
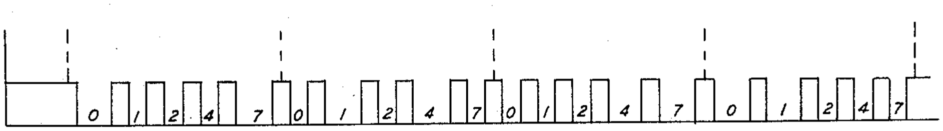
Fig. 8 shows a typical loop current wave form which is produced when the impulse wheel in the dial is released.

A typical loop current wave form is illustrated in Fig. 8. If the lugs are set to transmit the subscriber's numerals "7501," when the identification impulse wheel is released, twenty pulses are sent out in four groups of five pulses each. Each group of five transmits two long pulses and three short pulses, thus sending out the desired information.

Figure 3:
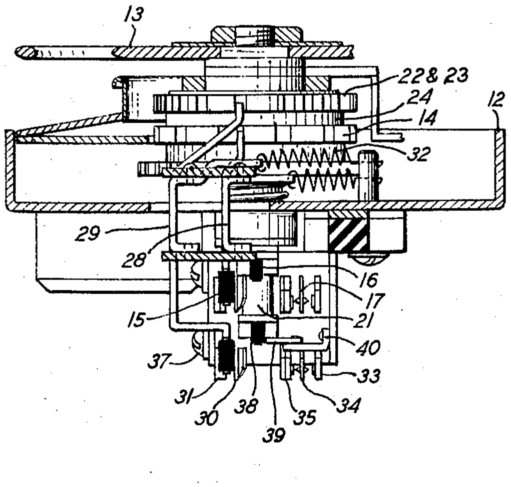
Fig. 3 represent a sectional view taken along the line 3—3 in Fig. 1.
Figure 4:
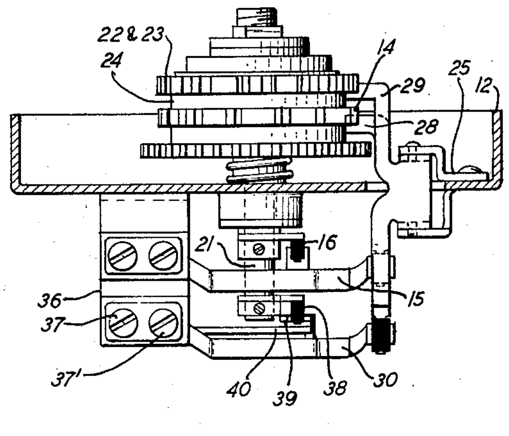
Fig. 4 is another sectional view taken along the line 4—4 in Fig. 1, showing the positioning of the identification contacts.

Referring now to Fig. 3, the keyway 22 is mounted on a boss 24 just above the normal impulse wheel 14 and is either keyed or riveted in place so that it rotates with the shaft 21.

Figure 2:
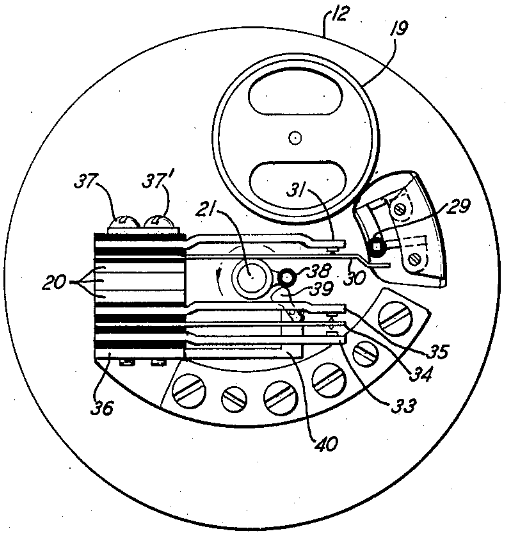
Fig. 2 is a rear view illustrating the spring assembly.
Figure 9:
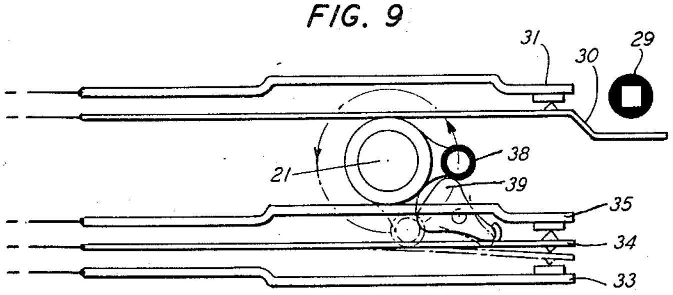
Fig. 9 is an enlarged detail view of the identification impulse springs and the cam-operated transfer switch.

Attached to the cup-shaped member 12 is a bracket 25 with two extensions, 26 and 27, as shown in Fig. 1. The extension 26 operates as a pivot for the normal pawl 28, which actuates the dial impulse spring 15 as previously described. The extension 27 is placed in a plane slightly above extension 26 so that it may act as a pivot for the identification pawl 29. This pawl extends downward from the identification impulse wheel 22 and 23 so that its free end is in a position to actuate the identification impulse spring 30 as shown in Fig. 2. It is controlled by a coil spring 32 which pulls the pawl back into position as each coded pulse is sent out during the return (counterclockwise) movement of the dial from the eleventh impulse position. The identification impulse springs 30 and 31 and the transfer switch springs 33, 34 and 35 are supported by an extension of the bracket 36 and are held in place by two screws 37 and 37'. These springs are illustrated in detail in Fig. 9 and also in the schematic wiring diagram, Fig. 11.

The transfer switch springs 33, 34 and 35 short-circuit the identification impulse springs 30 and 31 in the dial normal position and during regular dialing, only the regular dial impulse contacts being effective. During the forward motion of the dial using the eleventh hole, the spring 34 remains in its normal position due to its natural resiliency. As the eleventh impulse position is approached, an insulated roller 38, which is attached to the dial shaft 21, engages and pivots the cam 39. This transfers spring 34 from contact with spring 35 into contact with spring 33 and locks the spring 34 in this position so that the normal dial impulse contacts are short-circuited and the short circuit is removed from the identification impulse springs 30 and 31. The cam 39 is supported by a member 40 that is secured to the bracket 36 as shown in Fig. 2. The cam pivots about an axis perpendicular to member 40 and is so positioned that it will lock in place when actuated by the insulated roller 38.

As the dial is released from its eleventh impulse position following manipulation by way of the eleventh hole, the identification pawl 29 alternately opens and closes the identification impulse springs 30 and 31, causing either a long or short break in the line circuit depending upon the code arrangement of the information being sent. When the dial returns to its rest position after this information has been transmitted, the cam-operated transfer switch spring 34 is released to normal when the returning roller 38 unlocks cam 39. Thus, the identification impulse springs 30 and 31 are short-circuited, and the short circuit is removed from the dial impulse contacts.

Other details will be understood from the following description of the mode of operation of the device.

The subscriber first utilizes the calling device by dialing the number of the party to be called. This is accomplished in the usual manner and is adequately described in the Forsberg patent hereinbefore referred to. If the call is local, no further dialing is required. However, if the call is a toll call the subscriber then dials the finger hole marked "11," "Toll," or other appropriate designation. As this hole approaches the finger stop 41, the insulated roller 38 operates the cam 39 which in turn actuates the transfer switch spring 34, short-circuiting the normal dial impulse spring 15 and removing the short circuit from the identification impulse springs 30 and 31. The necessary connections to accomplish this result are illustrated in Fig. 11, where the switches 42 in closing and 42' place the substation set across the line when the subscriber lifts the receiver.

As the dial is released, the identification impulse wheel 22, with its corresponding lugs 23, rotates in a counterclockwise direction, causing the pawl 29 to alternately open and close the identification impulse springs 30 and 31. Thus, twenty identification impulses are sent out to the central office register in the two-out-of-five self-checking code. The identification impulse wheel may be preset to transmit the subscriber's calling number, or it may be modified to send out class of service or other desired information.

After these impulses have been transmitted, the returning roller 38 again operates the cam 39. This releases the transfer switch spring 34 so that it can return to its normal position, thus short-circuiting the identification impulse springs 30 and 31.

The impulses transmitted in the foregoing manner are sent to the central office where the desired information can be translated and evaluated. A convenient means for accomplishing this may be found in the copending application of Karl Goldschmidt, Serial No. 478,698, filed December 30, 1954.

Although a particular embodiment of the invention has been shown and described, it will be understood that it is but illustrative and that various modifications may be made thereon without departing from the scope and spirit of the invention.

What is claimed is:

1. In a calling device, an actuating member having a normal position, a plurality of other positions and an additional position, means for returning said actuating member to said normal position after operation thereof to any one of said other or additional positions, a first impulse member responsive to return of said actuating member from any of said other positions, first contacts actuated by said first impulse member, a second impulse member responsive to return of said actuating member from said additional position, second contacts actuated by said second impulse member, and means for disabling said first contacts during return of said actuating member from said additional position.

2. An impulse transmitting device comprising a movable mechanism settable into a plurality of regular positions and into an additional position, means for imparting to said mechanism a motion characterized differently for each different position, a first impulse sender effective in response to a regular motion of said mechanism to produce impulses characteristic of a regular position, and a second impulse sender effective in response to said additional motion of said mechanism to produce impulses characteristic of said additional position.

3. An impulse transmitting device comprising a movable mechanism settable into a plurality of regular positions and into an additional position, means for imparting to said mechanism an amount of motion characterized differently for each different position, a first impulse sender effective in response to a regular motion of said mechanism to produce impulses characteristic of a regular position, and a second impulse sender effective only in response to said additional amount of motion of said mechanism to produce impulses characteristic of said additional position.

4. An impulse transmitting device comprising a movable mechanism having a normal position and settable into a plurality of regular positions and into an additional position, means for imparting to said mechanism a motion characterized differently for each different position, a first impulse sender effective in response to a regular motion of said mechanism to produce impulses characteristic of a regular position, and a second impulse sender effective in response to motion of said mechanism from said additional position to said normal position to produce impulses characteristic of said additional position.

5. An impulse transmitting device comprising a movable mechanism settable into a plurality of regular positions and into an additional position, means for imparting to said mechanism a motion characterized differently for each different position, a first impulse sender rendered effective by a regular motion of said mechanism to produce impulses characteristic of a regular position, a second impulse sender rendered effective by said additional motion of said mechanism to produce impulses characteristic of said additional position, and means for rendering ineffective one of said impulse senders when the other of said impulse senders is effective.

6. An impulse transmitting device comprising a rotatable mechanism settable into a plurality of regular positions and into an additional position, means for imparting to said mechanism an amount of rotation characterized differently for each different position, a first impulse sender responsive to a regular amount of rotation of said mechanism to produce impulses characteristic of a regular position, and a second impulse sender responsive only to said additional amount of rotation of said mechanism to produce impulses characteristic of said additional position.

7. An impulse transmitting device comprising a movable mechanism settable into a plurality of regular positions and into an additional position, means for imparting to said mechanism a motion characterized differently for each different position, a first impulse sender responsive to a regular motion of said mechanism to produce impulses characteristic of a regular position and a second impulse sender responsive to said additional motion of said mechanism to produce impulses characteristic of said additional position, said second impulse sender including an impulse member controlled by said mechanism and including contacts controlled by said impulse member.

8. An impulse transmitting device comprising a movable mechanism settable into a plurality of regular positions and into an additional position, means for imparting to said mechanism a motion characterized differently for each different position, a first impulse sender operated by a regular motion of said mechanism to produce impulses characteristic of a regular position, a second impulse sender operated by said additional motion of said mechanism to produce impulses characteristic of said additional position, said second impulse sender including an impulse member operated by said mechanism and including contacts actuated by said impulse member, and means for preventing the operation of one of said impulse senders when the other of said impulse senders is operated.

9. An impulse transmitting device comprising a movable mechanism settable into a plurality of regular positions and into an additional position, means for imparting to said mechanism a motion characterized differently for each different position, a first impulse sender responsive to a regular motion of said mechanism to produce impulses characteristic of a regular position and a second impulse sender responsive to said additional motion of said mechanism to produce coded impulses characteristic of said additional position, said second impulse sender including an impulse member operated by said mechanism, said member having a plurality of projections thereon and said second impulse sender including contacts actuated by said projections for transmitting one or more impulses in code.

10. An impulse transmitting device comprising a movable mechanism settable into a plurality of regular positions and into an additional position, means for imparting to said mechanism a motion characterized differently for each different position, a first impulse sender responsive to a regular motion of said mechanism to produce impulses characteristic of a regular position and a second impulse sender responsive to said additional motion of said mechanism to produce impulses characteristic of said additional position, said second impulse sender including an impulse wheel rotated by said mechanism, said wheel having a plurality of projections thereon and said second impulse sender including contacts actuated by said projections for transmitting groups of impulses wherein each group is representative of a digit.

11. An impulse transmitting device comprising a rotatable mechanism settable into a plurality of regular positions and into an additional position, means for imparting to said mechanism a rotation characterized differently for each different position, a first impulse sender responsive to a regular rotation of said mechanism to produce impulses characteristic of a regular position and a second impulse sender responsive to said additional rotation of said mechanism to produce impulses characteristic of said additional position, said second impulse sender including an impulse wheel rotated by said mechanism, said wheel having adjustable groups of projections along the periphery thereof and said second impulse sender including contacts actuated by said projections for transmitting groups of impulses wherein each group is representative of a digit.

12. An impulse transmitting device comprising a rotatable mechanism having a normal position and settable into a plurality of regular positions and into an additional position, means for imparting to said mechanism a rotation characterized differently for each different position, a first impulse sender responsive to a regular rotation of said mechanism to produce impulses characteristic of a regular position and a second impulse sender responsive to said additional rotation of said mechanism from said additional position to said normal position to produce impulses characteristic of said additional position, said second impulse sender including an impulse wheel rotated by said mechanism, said wheel having groups of projections along the periphery thereof, the number and nature of said projections being in the aggregate characteristic of said transmitting device, said second impulse sender including contacts actuated by said projections for transmitting groups of impulses wherein each group is representative of a digit.

13. An impulse transmitting device comprising a rotatable mechanism having a normal position and settable into a plurality of regular positions and into an additional position, means for imparting to said mechanism a rotation characterized differently for each different position, a first impulse sender operated by a regular rotation of said mechanism for producing impulses characteristic of a regular position, a second impulse sender operated only by rotation of said mechanism from said additional position to said normal position for producing impulses characteristic of said additional position, said second impulse sender including an impulse wheel rotated by said mechanism, said wheel having adjustable groups of projections along the periphery thereof, the number and nature of said projections being in the aggregate characteristic of said transmitting device, said second impulse sender including contacts actuated by said projections for transmitting groups of impulses wherein each group is representative of a digit, and means for preventing the operation of one of said impulse senders when the other of said impulse senders is operated.

14. The invention as defined in claim 13 wherein the said groups of projections comprise a plurality of replaceable digital segments of said wheel and wherein each segment includes along the periphery thereof a uniform number of teeth the width of some of which differs from others according to a desired code.

15. The invention as defined in claim 14 wherein four segments are provided on said wheel, each of said segments having five teeth the width of two of which 4 differs from the others in a 2-out-of-5 code.

16. An impulse transmitting device comprising a dialing means, biased to a normal position and movable therefrom to a plurality of impulse initiating positions and to an additional impulse initiating position; a first impulse sending means, operable upon the return to the normal position of the said dialing means from any one of the said plurality of impulse initiating positions to produce a corresponding number of impulses; second impulse sending means, operable upon the return to the normal position of the said dialing means from the said additional impulse initiating position to produce groups of impulses, each expressing a digit in code.

References Cited in the file of this patent

UNITED STATES PATENTS

| | | |
|---|---|---|
| 2,290,448 | Puckette | July 21, 1942 |
| 2,433,366 | Hersey | Dec. 20, 1947 |
| 2,581,689 | Mitchell | Jan. 8, 1952 |
| 2,581,697 | Ostline | Jan. 8, 1952 |
| 2,691,070 | Morris | Oct. 5, 1954 |
| 2,691,071 | McCheyne | Oct. 5, 1954 |